United States Patent
Meier et al.

(10) Patent No.: US 6,211,887 B1
(45) Date of Patent: Apr. 3, 2001

(54) SYSTEM AND METHOD FOR DATA VISUALIZATION

(75) Inventors: Bernhard Meier, Kista (SE); Robert Gupton, McKinney, TX (US)

(73) Assignee: Ericsson Inc, Research Triangle Park, NC (US)

( * ) Notice: Subject to any disclaimer, the term of this patent is extended or adjusted under 35 U.S.C. 154(b) by 0 days.

(21) Appl. No.: 09/086,210

(22) Filed: May 28, 1998

(51) Int. Cl.[7] .................................................. G06T 11/20
(52) U.S. Cl. ............................................ 345/440; 345/441
(58) Field of Search ...................................... 345/440, 441

(56) References Cited

U.S. PATENT DOCUMENTS

| | | | |
|---|---|---|---|
| 4,674,043 | 6/1987 | Hernandez et al. | 364/401 |
| 5,307,903 | * 5/1994 | Morita et al. | 187/124 |
| 5,313,571 | * 5/1994 | Hirose et al. | 395/140 |
| 5,408,596 | * 4/1995 | Nonaka et al. | 395/140 |
| 5,414,809 | 5/1995 | Hogan et al. | 395/155 |
| 5,581,687 | 12/1996 | Kahn | 395/140 |
| 5,611,034 | * 3/1997 | Makita | 395/140 |
| 5,619,631 | 4/1997 | Schott | 395/140 |
| 5,885,229 | * 3/1999 | Yamato et al. | 600/592 |
| 5,918,222 | * 6/1999 | Fukui | 707/1 |

OTHER PUBLICATIONS

"Excel for Windows 95 Secrets", by Pat J. Burns and John R. Nicholson, 1996, Library, p. 24, 198, 204–205, 213–217.*

* cited by examiner

*Primary Examiner*—Jeffery Brier
*Assistant Examiner*—G. F. Cunningham
(74) *Attorney, Agent, or Firm*—Jenkens & Gilchrist (57) ABSTRACT

A system and method for visualizing information on a computer system by generating and displaying a number of axes on a computer monitor, selecting points along respective axes which correspond to an information entry using a mouse or any other spatially-based input device, and forming a polygonal shape therefrom, the vertices of the polygon being the respective selected points. Multiple such polygons may be serially displayed or overlaid to facilitate visualization and interpretation of the information. The system and method of the present invention are further directed to facilitating the entry, modification and storage of a record in a computer system by displaying it on a polar chart, selecting a point on the polar chart with a mouse or any other spatially-based input device, and respectively entering, modifying and storing the record.

29 Claims, 7 Drawing Sheets

SYSTEM AND METHOD FOR DATA VISUALIZATION

BACKGROUND OF THE PRESENT INVENTION

1. Field of the Invention

The present invention relates generally to systems and methods for the visualization of data having multiple attributes, and specifically to facilitating the creation, alteration and storage of the multiple-attribute data.

2. Background and Objects of the Present Invention

Advances in computers systems have greatly simplified the task of information processing. Computer systems can typically store large amounts of information in a relatively small area of physical space and permit the information stored to be easily accessed and modified. Computer systems also allow large amounts of information to be processed both quickly and accurately.

One of the key drawbacks to the use of computer systems are the non-intuitive procedures and commands that an operator must go through in order to enter and view the information. A user interface is the mechanism by which the user and the computer system communicate. The user interface prompts the user to enter the information when the computer system is ready to take the information. When the user desires for a particular function to be performed, such as displaying recorded information, a request to perform the function can be communicated through the user interface.

Recent user interfaces have led to simpler and more intuitive procedures for operators to enter and view information. For example, programs known in the art as spreadsheets, provide user interfaces where the user enters information as elements in a chart-like format. In general, spreadsheets comprise multiple rows and columns arranged in a chart-like format. Each row comprises one cell for each column, and each column comprises one cell for each row. The columns usually represent a measurable attribute while the rows usually represent, for example, a person, item, event, transaction, or entity (which shall now be referred to herein as an "instance"). The information entered in each cell represents a measurement of the attribute represented by the column containing the cell for the instance represented by the row containing the cell.

Special commands allow the user to perform mathematical and statistical calculations on individual entries, rows, columns, and blocks, and store the results in the chart. Once the information is entered into the chart, the program allows the information to be displayed to the user in a number of different formats such as bar charts, pie charts, and graphs.

The information can also be displayed in a format known by those skilled in the art as a polar chart, which is also known in the art as a spider or star chart. A polar chart is a visual representation of the measurements of the attributes pertaining to an instance. Each attribute is represented by an axis which is formed by a line that forms a radius of a circular region. The axis has one or more hashmarks thereon, each of which represent predetermined measurements of the attribute along the axis. The measurements of the attribute pertaining to the instance represented by the polar chart are represented by a marker placed at or near the hashmark representing the equivalent measurement. In cases where the hashmarks represent numerical or other measurements forming a portion of a continuous spectrum, a marker may be placed proportionally between two hashmarks, said proportion being related to the numerical difference between the predetermined measurements represented by the hashmarks and the measurement of the attribute represented by the marker. A set of lines are drawn connecting each of the markers, and where there are three or more axes, a closed polygon is formed. The polygon is, therefore, a visual representation of three or more information entries.

Those skilled in the art will recognize a number of advantages of representing information in polygonal form. For example, when comparing sets of information entries, a visual comparison of a pair of polygons is likely to be faster than the comparison of rows of purely numerical information.

While the use of polygons presents a more intuitive method of representing information, complications still exist during the process of entering or modifying information. The information that is to be represented using polygons is usually first entered through the use of spreadsheets which are often cumbersome, tedious, and monotonous. Furthermore, in many cases, the information represented by polygons changes over time, necessitating subsequent access and modification using the spreadsheet. Once the information is so modified, the polygon is then regenerated.

Accordingly, it is an object of the present invention to provide an improved system and method for facilitating the visualization of information.

It is also an object of the present invention to provide an improved system and method for entering information into a computer system, simplifying the data entry process.

It is a further object of the present invention to provide an improved system and method for modifying information stored in a computer system.

SUMMARY OF THE INVENTION

The present invention is directed to a system and method for visualizing information on a computer system by generating and displaying a number of axes on a computer monitor, selecting points along respective axes which correspond to an information entry using a mouse or any other spatially-based input device, and forming a polygonal shape therefrom, the vertices of the polygon being the respective selected points. Multiple such polygons may be serially displayed or overlaid to facilitate visualization and interpretation of the information.

The system and method of the present invention are further directed to facilitating the entry, modification and storage of a record in a computer system by displaying it on a polar chart, selecting a point on the polar chart with a mouse or any other spatially-based input device, and respectively entering, modifying and storing the record.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
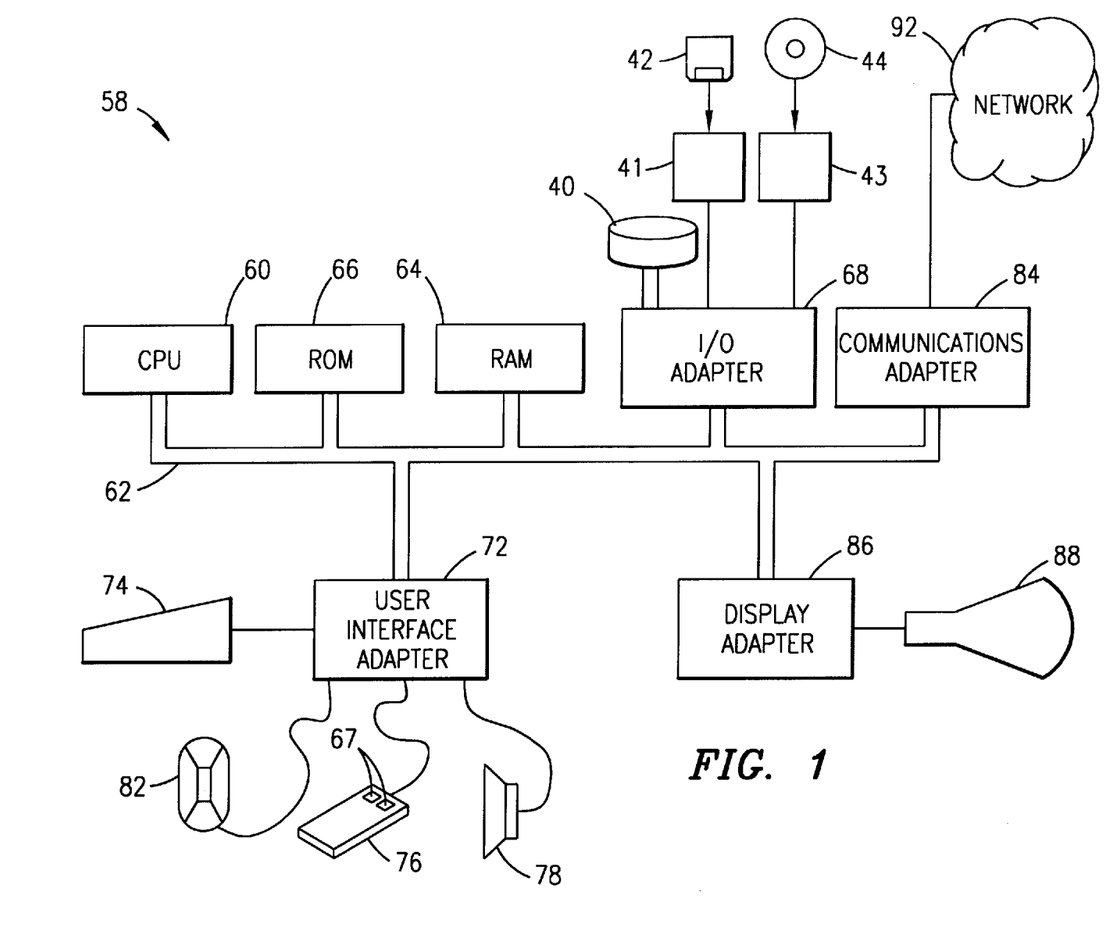
FIG. 1 is a diagram illustrating a computer system configurable for embodying the principles of the present invention.

Referring now to FIG. 1, a representative hardware environment for a computer system 58 for practicing the present invention is depicted. A CPU 60 is interconnected via system bus 62 to random access memory (RAM) 64, read only memory (ROM) 66, an input/output (I/O) adapter 68, a user interface adapter 72, a communications adapter 84, and a display adapter 86. The input/output (I/O) adapter 68 connects peripheral devices such as hard disc drives 40, floppy disc drives 41 for reading removable floppy discs 42, and optical disc drives 43 for reading removable optical disc 44 (such as a compact disc or a digital versatile disc) to the bus 62. The user interface adapter 72 connects devices such as a keyboard 74, a mouse 76 having a plurality of buttons 67, a speaker 78, a microphone 82, and/or other user interfaces devices such as a touch screen device (not shown) to the bus 62. The communications adapter 84 connects the computer system to a data processing network 92. The display adapter 86 connects a monitor 88 to the bus 62.

An embodiment of the present invention can be implemented as sets of instructions resident in the random access memory 64 of one or more computer systems 58 configured generally as described in FIG. 1. Until required by the computer system 58, the set of instructions may be stored in another computer readable memory, for example in a hard disc drive 40, or in removable memory such as an optical disc 44 for eventual use in an optical disc drive 43, or a floppy disc 42 for eventual use in a floppy disc drive 41. Execution of the set of instructions causes a graphical user interface, as shown in FIG. 2, to appear on the monitor 88.

Figure 2:
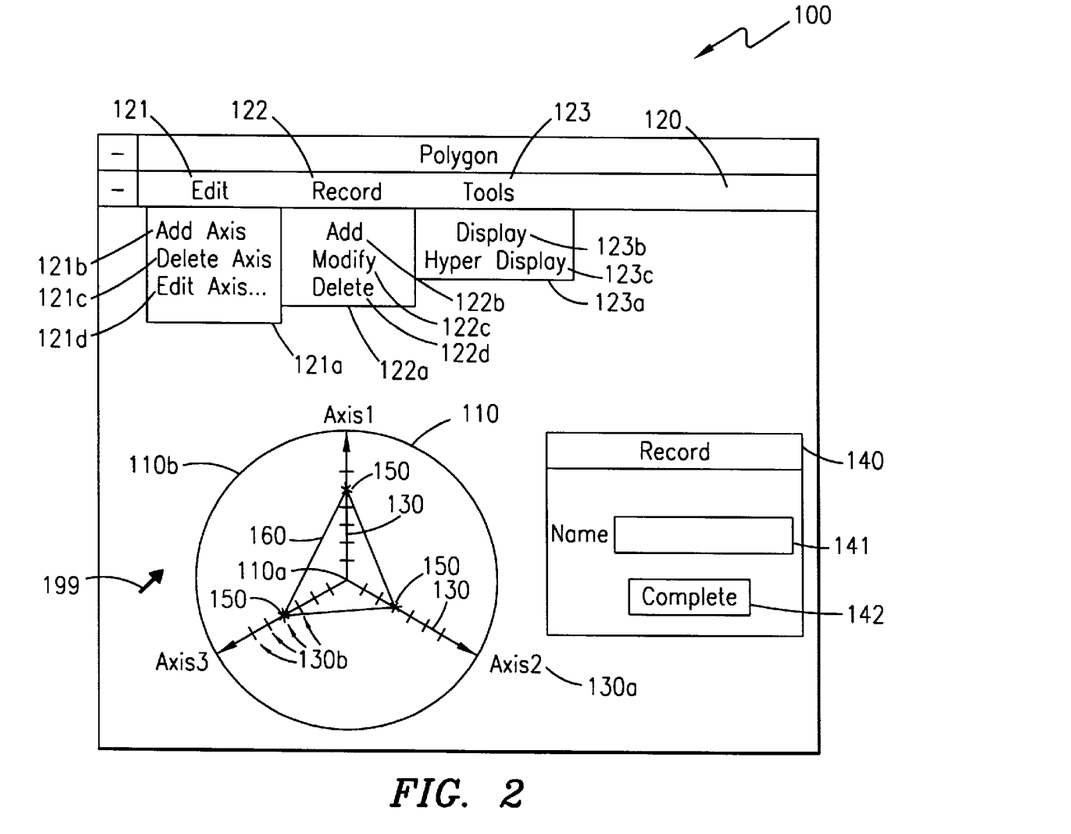
FIG. 2 is a diagram illustrating a graphical user interface embodying the principles of the present invention.

Referring now to FIG. 2, a graphical user interface, generally designated by the reference numeral 100, is shown such as would appear on the monitor 88 of the computer system 58, e.g., as a window 100 thereon. It should be understood, however, that the graphical user interface 100 can actually be implemented by any reserved and defined area on the monitor 88. As shown in FIG. 2, the graphical user interface 100 preferably includes therein a circular region 110 having a center 110a and a circumference 110b for containing a number of axes 130 therein. The axes 130 are preferably ruled lines with a number of hashmarks 130b, each axis 130 emerging from the center 110a of the circular region 110 and terminating at a point substantially along the circumference 110b, as shown in FIG. 2. Each axis 130 has a respective header 130a associated therewith which is either a user-defined label or a numerical default label, e.g. "Axis 1", which identifies a particular axis 130 and is adjacent the respective axis 130. Preferably, the header 130a describes the particular attribute measured by the axis 130, e.g., a given user's proficiency in a particular computer programming language or application. The graphical user interface 100 preferably also contains a menu bar 120, which contains therein an Edit menu 121, a Record menu 122, and a Tools menu 123, respectively, discussed further hereinafter.

A user can add or delete a particular axis 130 from the circular region 110 by guiding an arrow, such as generally indicated by reference identifier 199, over the Edit menu 121 using the aforedescribed mouse 76 (or other input device, not shown) and depressing one of the buttons 67 thereon. The process of guiding the arrow to a window location with the mouse 76 and depressing the button 67 is known in the art as "pointing and clicking" the location. Pointing and clicking the Edit menu 121 of the menu bar 120 causes an Edit menu bar 121a to appear, as shown in FIG. 2.

The Edit menu bar 121a preferably includes therein an Add Axis function 121b, a Delete Axis function 121c, and an Edit Axis function 121d. Pointing and clicking the Add Axis function 121b, for example, results in the addition of another axis 130 to the circular region 110, which may result in a reorientation of the respective axes 130 within the circular region 110, for example, the three axes shown in FIG. 2 being separated apart by 120 degrees are separated by 90 degrees after the addition of a fourth axis 130. It should, of course, be understood that the degree separations need not be uniform. Pointing and clicking the Delete Axis function 121c followed by pointing and clicking a particular axis 130 causes the deletion of that particular axis 130 from the circular region 110, which, as discussed, may result in a reorientation of the remaining axes 130. Alternatively, the user could first specify the particular axis 130 for deletion by pointing and clicking the respective header 130a of the particular axis 130, causing the header 130a to be placed in bold print, underlined, or otherwise highlighted, and then point and click the Delete Axis function 121c.

It should be understood that in an alternative embodiment the user can cause a particular axis 130 to be added or deleted in a different manner. For example, the user may point and click any point within the circular region 110 to add an axis 130 by depressing one button 67 on the mouse 76 and point and click with another button 67 to delete an axis 130. In another alternative embodiment, the user may depress a particular key or combination of keys on the keyboard 74 to add or delete an axis 130.

An axis 130 can also be added to or deleted from the circular region 110 by erasing all of the axis 130 in the circular region 110. Accordingly, a location in memory, e.g., RAM 64, hard disc drive 40, floppy disc 42, or optical disc 44, which records the number of axes 130 in the circular region 110, may be incremented for adding or decremented for deleting a given axis 130. A set of lines, i.e., the respective axes 130, is then drawn emerging from the center 110a of the circular region 110 and terminating at a point along the circumference 110b, preferably evenly spaced apart. The Cartesian coordinates of each point for each axis 130 is described by the following equation:

$$cx + r\cos\left(\frac{\pi}{2} - \frac{2\pi i}{n}\right), cy + r\sin\left(\frac{\pi}{2} - \frac{2\pi i}{n}\right)$$

where n=number of axes 130;

i=the ordinal number of the present axis 130;

r=the radius of the circular region 110;

cx=the x-coordinate of the center 110a;

cy=the y-coordinate of the center 110a;

for i=1 to n axes. To prevent what is known in the art as a divide-by-zero error, the user is preferably not permitted to delete an axis 130 when there is only one axis 130 in the circular region 110.

Figure 3:
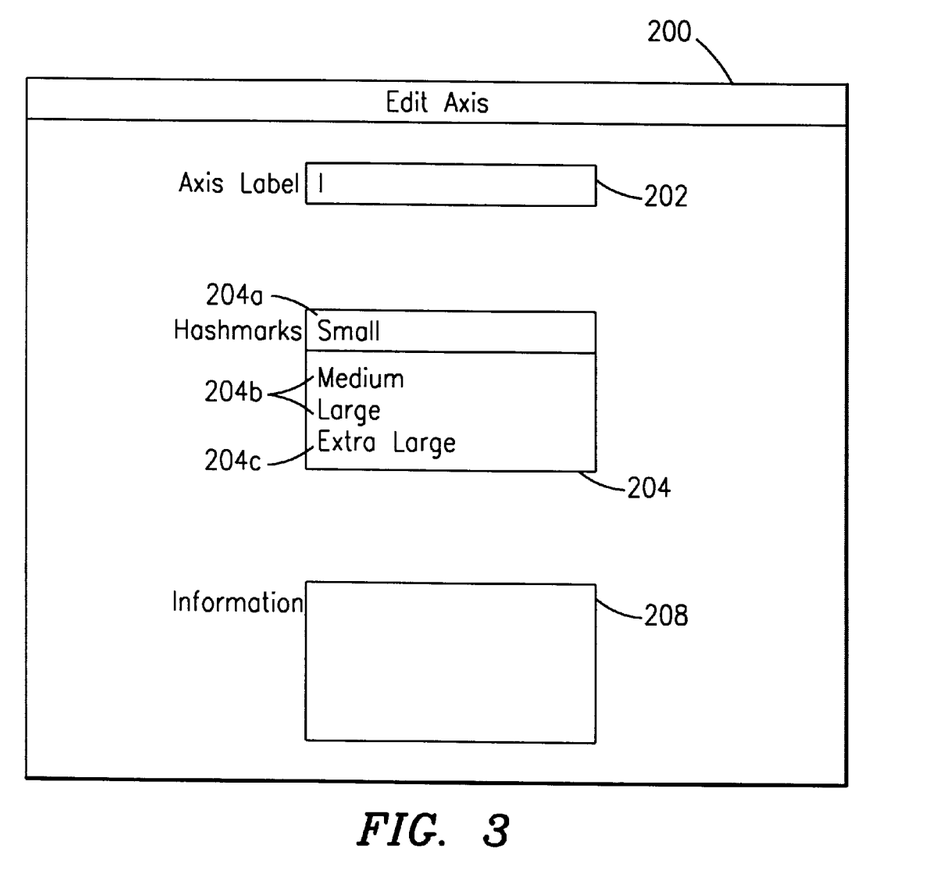
FIG. 3 is a diagram illustrating an editing graphical user interface utilized in the system and method of the present invention.

The user can also define certain parameters with respect to a given axis 130 by pointing and clicking the header 130a of the axis 130, pointing and clicking the Edit menu 121 on the menu bar 120 which causes the Edit menu bar 121a to appear, and pointing and clicking the Edit function 121d, which causes another graphical user interface to appear, as shown in FIG. 3.

Referring now to FIG. 3, which will be discussed in connection with FIG. 2, an editing graphical user interface, generally designated by the reference numeral 200, is shown, such as would appear on the aforementioned monitor 88 of computer system 58, e.g., a window 200. The editing graphical user interface 200 includes therein an Axis Label field 202, a Hashmark field 204, and an Information field 208. Each field, 202, 204, and 208, respectively, can be implemented by what is conventionally known in the art as a text box.

The information entered into the Axis Label field 202 defines the header 130a of a given axis 130. The user can then define the hashmarks 130b of the axis 130 by entering information in the Hashmark field 204. The Hashmark field 204 can hold any number of lines of text 204a, 204b, and 204c. The top line of text 204a represents the hashmark 130b which is closest to the center 110a of the circular region 110. Each successive line of text 204b labels a hashmark 130b farther from the center 110a of the circular region 110. The bottom line of the text 204c represents the hashmark 130b that is closest to the circumference 110b of the circular region 110.

In the case where the hashmarks 130b represent numerical values, the user can simply enter the lowest possible numerical value in the topmost line 204a of the Hashmark field 204, enter an intermediate value on the next line 204b, and enter the highest possible value on the bottom line 204c. Hashmarks 130b are then spread apart at increments equal to the difference between the intermediate value and the lowest value.

The user can also enter additional information regarding the axis in the Information field 208. For example, the information entered in the Information field 208 can further describe the attribute measured by the axis 130. In another example, the information entered in the Information field 208 can further describe the meaning or measurements associated with the hashmarks 130b of the axis 130.

With further reference to FIG. 2, after the appropriate number of axis 130 are added to the circular region 110, the user can enter information in the form of records. A record is a complete set of each of the measurements of the various attributes measured by the axis pertaining to an instance, along with an identifier for the record instance. Information may be entered in the form of records by pointing and clicking the Record menu 122, causing a Record menu bar 122a to appear. The Record menu bar 122a has an Add function 122b, a Modify function 122c, and a Delete function 122d.

Pointing and clicking the Add function 122b, for example, causes a record graphical user interface 140 to appear, as shown in FIG. 2. The record graphical user interface 140 includes therein a name field 141 and a complete button 142. The user can enter an identifier of the instance to be associated with the record by entering information in the name field 141 of the record graphical user interface 140.

The user enters information by pointing and clicking a point along an axis 130 in the circular region 110. The point along the axis 130, which is designated by pointing and clicking represents a measurement of the attribute measured by the axis 130 as it pertains to the identified instance in the name field 141. A marker 150 is placed at or near the point along the axis 130 which was pointed and clicked. A marker 150 is a visual symbol which highlights or identifies the pointed and clicked point. A measurement can be modified by pointing and clicking another point on the axis 130 causing the marker 150 to be moved. As a point on each successive axis 130 is designated, the marker 150 is placed substantially at the location of the pointing and clicking. It should be understood that the hashmarks 130b along the axis 130 may be used to guide the user. After a marker 150 has been placed on each axis 130, the record entry is completed. For example, each axes 130 may represent the level of skill or proficiency of a given individual in computer languages/applications, the types of crimes perpetrated by a given criminal, marketing information about a given product, technical data on a device or any number of characteristics associated with a particular item which may be quantified and illustrated in numerical/graphical form.

A set of lines 160 are then drawn connecting each marker 150 along adjacent axes 130, the combination of which forms a polygon, e.g., the triangle shown in FIG. 2. Alternatively, the lines 160 may be drawn connecting each marker 150 immediately after it is placed on a given axis 130 in the circular region 110. Once the user is satisfied with the measurements entered for the record, the user can then point and click the complete button 142.

Pointing and clicking the complete button 142 causes the measurements entered and the associated identifier of the instance to be stored in memory (e.g., RAM 64, hard disc drive 40, floppy disc 42, or optical disc 44) as a record. In particular, the measurements corresponding to the placement of the markers 150 along the axis 130 are associated with the identifier entered by the user in the name field 141, e.g., the Pascal computer language, criminal assaults, productivity in a given month, testing data, etc. With the information stored, the markers 150 and the connecting lines 160 may be removed from the graphical user interface 100, and entry in the name field 141 cleared. At this point, the user can proceed to enter additional records.

If a user wishes to change or modify a record that has already been stored in memory (e.g., RAM 64, hard disc drive 40, floppy disc 42, or optical disc 44), the user can point and click the Modify function 122c on the Record menu bar 122a. Pointing and clicking the Modify function 122c causes a Modify Record graphical user interface, generally designated by the reference numeral 300, to appear on the monitor 88 of the computer system 58.

Figure 4:
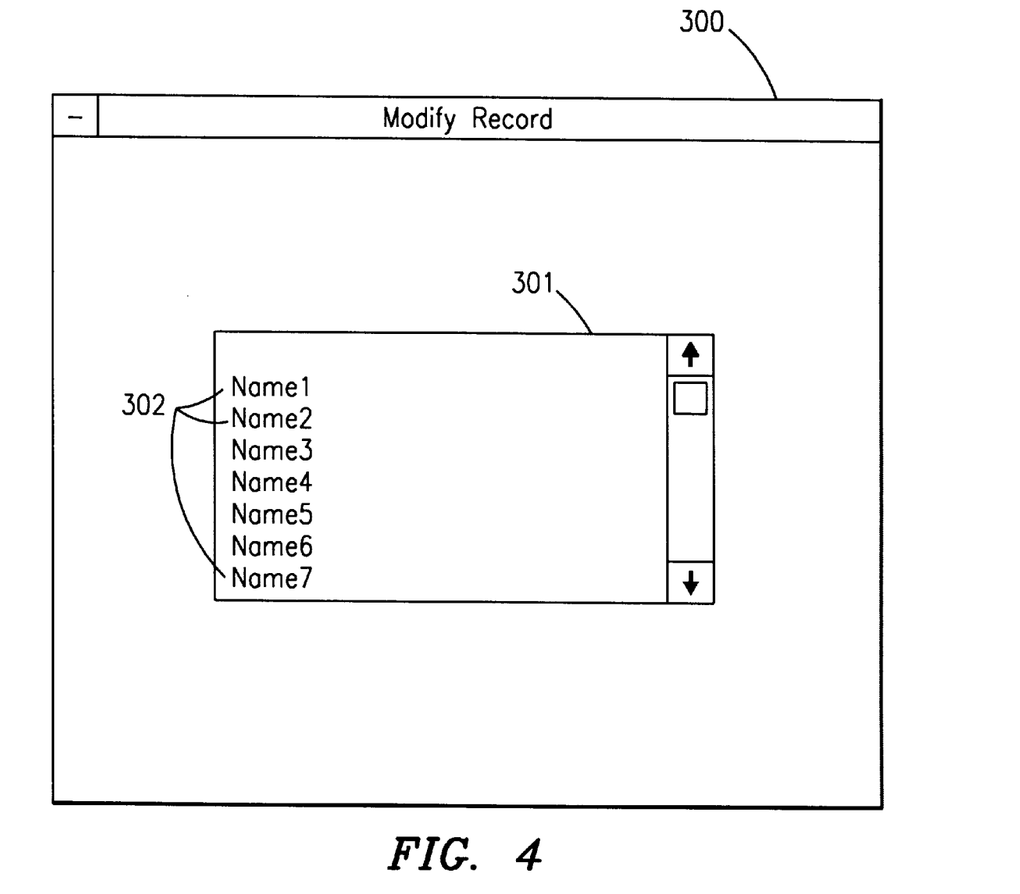
FIG. 4 is a diagram illustrating a Modify Record graphical user interface utilized in the system and method of the present invention.

Referring now to FIG. 4, which will be discussed in connection with FIG. 2, the Modify Record graphical user interface 300 includes a text window 301 therein which lists the identifiers of the various instances 302 associated with records stored in memory. The user can then select a record by pointing and clicking a particular instance identifier 302. It can be appreciated that in certain embodiments, the instance identifiers 302 in the text window 301 can be sorted alphabetically, chronologically according to order of entry, or in other manners.

Selecting an instance identifier 302 causes the stored information of the particular record associated with the instance identifier 302 to be redisplayed as discrete markers 150 along the respective axes 130 and the respective connecting lines 160 within the circular region 110, as illustrated in FIG. 2. The record graphical user interface 140 appears with the text of the selected instance identifier 302 in the name field 141. The user can then modify the record by pointing and clicking alternate points along one or more of the axes 130, thereby moving the respective markers 150. When satisfied with the revisions, the user can then point and click the complete button 142 on the record graphical user interface 140, thus storing the revisions in memory.

After the user is finished entering the information in the aforementioned records, the user can display the information in graphical form. With reference now to FIG. 2, pointing and clicking the Tool menu 123 on the menu bar 120 causes a Tool menu bar 123a to appear. The Tool menu bar includes a Display function 123b and a Hyper Display function 123c.

Figure 5:
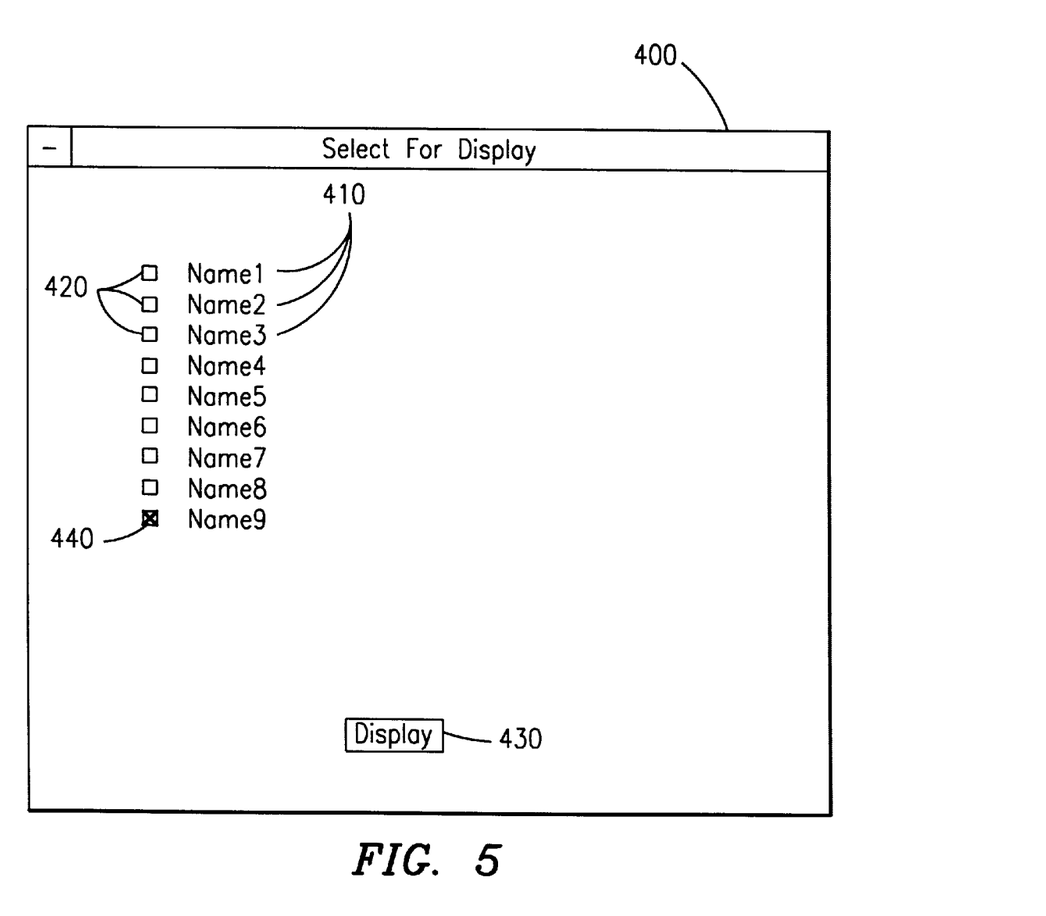
FIG. 5 is a diagram illustrating a Select For Display graphical user interface utilized in the system and method of the present invention.

Pointing and clicking the Display function 123b causes a Select For Display graphical user interface, generally designated by the reference numeral 400, to appear, as shown in FIG. 5, which will be described in connection with FIG. 2. As discussed in connection with the interfaces 100, 200 and 300 shown in FIGS. 2, 3 and 4, respectively, the Select For Display graphical user interface may also be implemented by a window 400, as shown in FIG. 5. The Select For Display graphical user interface 400 preferably includes text listing each instance identifier 410, which is entered by the user in the name field 141 of the record graphical user interface 140 and stored into the aforedescribed memory. Adjacent each instance identifier 410 in FIG. 5 is a check box 420, by which the user may request to display information associated with a particular instance identifier by pointing and clicking a respective check box 420, causing the check box 420 to be "ticked" (such as with check box 440). The Select For Display graphical user interface 400 also includes a Display button 430. The user points and clicks the Display button 430 when the user has finished selecting the instance identifiers 410 to be displayed.

Figure 6:
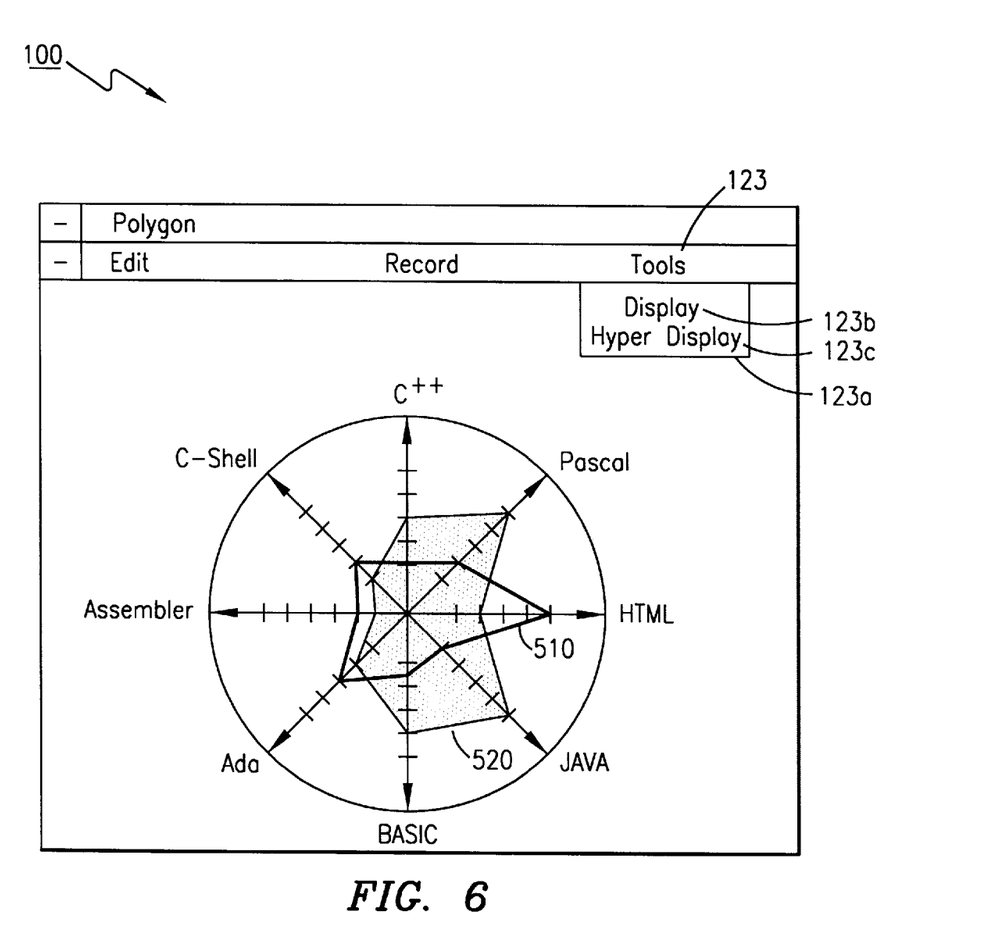
FIG. 6 is diagram illustrating the display of a record within the graphical user interface shown in FIG. 2.

Pointing and clicking the Display button 430 causes the information in the records associated with the selected instance identifiers 410 to be redisplayed as the aforementioned markers 150 and connecting lines 160 along the respective axes 130 in the circular region 110, which in the example of FIG. 5 is the checked box 440 instance for "Name9". Referring now to FIG. 6, which will be described in connection with FIG. 5, an exemplary illustration of the graphical user interface 100 displaying respective records associated with the selected instance identifiers 410 is described.

The graphical user interface 100 displays polygons 510 and 520 formed by the respective markers 150 and connecting lines 160 associated with each record associated with a selected instance identifier 410. In order to prevent confusion, the connecting lines 160 forming each polygon 510 and 520 can appear in different styles or in different colors. Any one of the displayed polygons 510 or 520 (polygon 520 in the exemplary illustration) can be filled-in or shaded by pointing and clicking one of the connecting lines 160 of the polygon 510 or 520. The respective polygons 510 and 520 in FIG. 6 provide a visual illustration of the proficiency of a computer specialist in various programming languages and applications. The shape and area of the respective polygons for various individuals may be so illustrated and compared, facilitating evaluation of individual(s) using multiple performance criteria.

While the user is displaying one or more polygons 510 and 520, the user can compare other records stored into memory by pointing and clicking the Hyper Display function 123c on the Tools menu bar 123a. Pointing and clicking the Hyper Display function 123c causes successive records entered by the user to be displayed one at a time along with the records associated with the selected instance identifiers 410.

Figure 7:
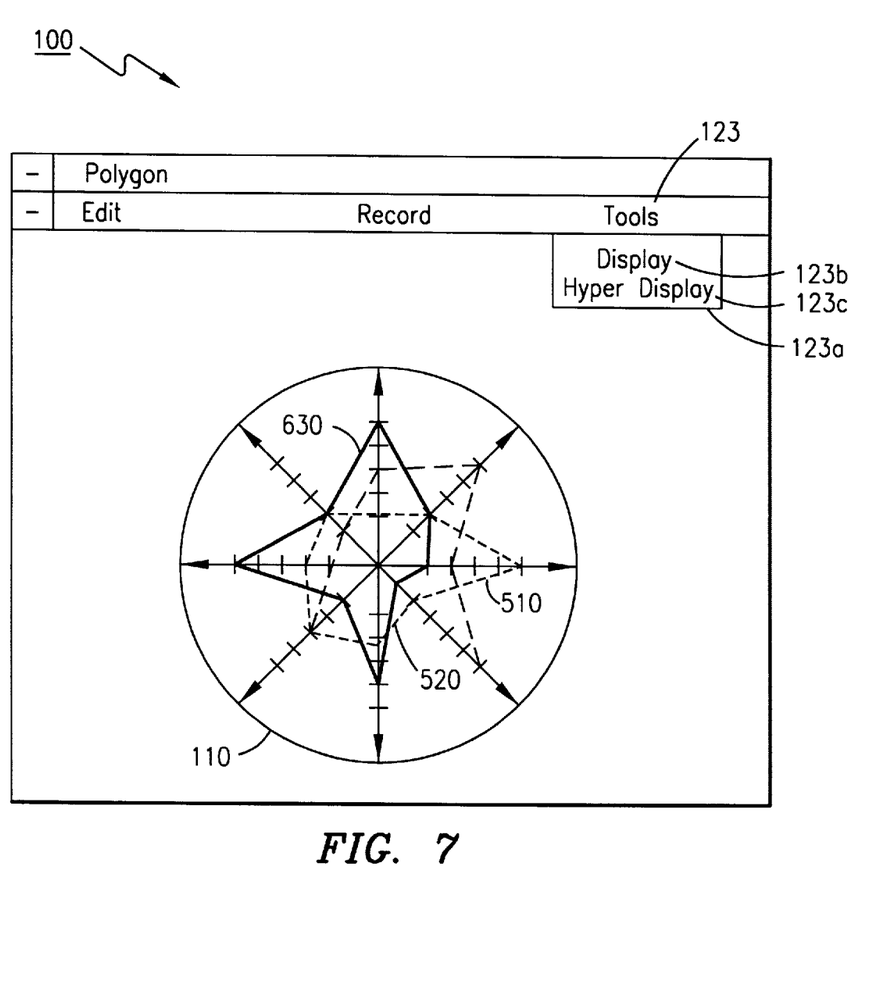
FIG. 7 is a diagram illustrating the display and comparison of record information within the graphical user interface shown in FIG. 2.

Referring now to FIG. 7, an exemplary illustration of the graphical user interface 100 displaying multiple records following selection of the Hyper Display function 123c is described. The graphical user interface 100 displays the polygons 510, 520 representing records selected by the user after pointing and clicking the Display function 123b as described above in connection with FIG. 6. By pointing and clicking the Hyper Display function 123c at least one additional polygon 630 appears automatically. It should, of course, be understood that further polygons (not shown) may also be depicted, as discussed above in connection with polygon 630. By varying shading and outlining, multiple records in polygonal form may be overlaid, further facilitating comparison and evaluation.

As discussed, the additional polygon 630 represents any one of the records which was entered by the user, who can then compare the new record by visually comparing the polygon 630 with the other polygons 510, 520. After the user has completed the comparison, the user may replace polygon 630 with another polygon representing another record entered by the user by, for example, depressing the mouse button 67. It can be appreciated that the user can quickly compare each record to the records represented by the polygons 510, 520 or other polygons by continuously comparing the polygons 630 thereto, and depressing the button 67 on the mouse 76. Those skilled in the art will recognize that there are a number of different orders for displaying the records represented by the polygon 630, such as alphabetically by the instance identifier associated with the record or order of entry.

In a presently preferred embodiment of the present invention competence management information is displayed to facilitate the analysis of the competence levels of individuals. For example, each axis 130 may represent the level of competence of an individual in a certain area (attribute). Each axis 130 could have hashmarks 130b or ticks representing experiential or competence levels from novice (near the center point 110a) to expert (near the circumference 110b). In this manner, the visualization mechanism of the present invention associates various meanings, i.e., inexperience to guru on a given topic, to the vertex of two sides of the polygon 510.

In another embodiment of the present invention, a viewer of the graphical user interface 100 tool may access information associated with a particular level at the indicated position along the axes 130. For example, reference or meaning text at the novice level may be accessed by pointing and clicking within the novice "area" in the circular region 110, e.g., between the center point 110 and the first hashmark 130b along a given axis 130, to access a hypertext document, which includes links to a training database with course descriptions and schedules for individuals to advance to the next level of experience, e.g., corresponding to the next hashmark 130b. The axes 130 may, therefore, also form a hierarchical reference tool.

It should be understood that although the minimum number of vertices (axes 130) required to form a polygon is three (triangle), larger numbers of axes 130 may be employed for data visualization, the only limits on the axial number being due to spatial and perceptual constraints. Accordingly, a practical range for axis 130 number is three to eight axes 130 at a time. Although greater numbers may offer difficulties in perception, it should be understood that the scope of the present invention encompasses the usage of three or more such axes 130.

Although the invention has been described with a certain degree of particularity, it should be recognized that elements thereof may be altered by persons skilled in the art without departing from the spirit and scope of the invention. Therefore, the invention is limited only by the following claims and their equivalents.

What is claimed is:

1. A method for displaying a plurality of information entries in a computer system having a monitor, memory and an input device, said method comprising the steps of:
   (a) generating and displaying a multiplicity of axes on said monitor, each said axis corresponding to a respective attribute of a given information entry;
   (b) selecting, by a user of said method by pointing and clicking said input device on each said axis, a respective point along the respective axis corresponding to a value for the respective attribute of said given information entry; and
   (c) connecting the respective selected points along each axis by forming respective lines between the respective selected points between adjacent axes, thereby forming a polygonal shape on the monitor.

2. The method according to claim 1, wherein at least one of said axes further comprises a plurality of hashmarks thereon.

3. A method according to claim 1, further comprising the step of:
   selecting, on each said axis with said input device, another respective point along the respective axis corresponding to a value for the respective attribute of another given information entry.

4. The method according to claim 1, further comprising the step of:
   storing the respective attributes for said given information entry.

5. The method according to claim 1, wherein at least one of said axes has an attribute designator associated therewith.

6. The method according to claim 1, further comprising the step of repeating steps (a)–(c) for a second information entry, forming a second polygonal shape corresponding thereto on said monitor.

7. The method according to claim 6, wherein said polygonal shape and second polygonal shape are overlaid.

8. The method according to claim 6, wherein said polygonal shape and second polygonal shape are serially displayed.

9. The method according to claim 1, further comprising the steps of repeating steps (a)–(c) a multiplicity of times for a corresponding multiplicity of information entries, forming a corresponding multiplicity of polygonal shapes.

10. The method according to claim 9, further comprising the step of displaying said multiplicity of polygonal shapes serially.

11. The method according to claim 1, further comprising the step of:
   reselecting at least one of said selected points along the respective axes;
   adjusting the value of the respective attribute corresponding to said at least one reselected point to another point along said respective axis; and
   modifying the polygonal shape formed by connecting the respective selected points using said reselected point.

12. The method according to claim 11, wherein said step of adjusting comprises using said input device to selectively slide said reselected point along the respective axis.

13. The method according to claim 1, further comprising the step of:
   accessing a hypertext document associated with a respective attribute of said given information entry.

14. A computer system for displaying a plurality of information entries therein, said system comprising:
   a monitor for displaying a plurality of axes thereon, each said axis corresponding to a respective attribute of a given information entry;
   selection means for selecting, by a user of said method by pointing and clicking an input device, on each said axis, a respective point along the respective axis corresponding to a value for the respective attribute of said given information entry; and
   connecting means for connecting the respective selected points along each axis by forming respective lines between the respective points between adjacent axes, thereby forming a polygonal shape on the monitor.

15. The system according to claim 14, wherein said plurality of axes are displayed within a window on said monitor.

16. The system according to claim 14, wherein at least one of said axes further comprises a plurality of hashmarks thereon.

17. The system according to claim 14, wherein each of said plurality of axes radiate from a common point substantially at the center of a substantially circular area thereabout.

18. The system according to claim 17, wherein the length of each said axis is substantially equivalent to the radius of said substantially circular area.

19. The system according to claim 17, wherein said circular area, common point and plurality of axes are displayed on said monitor.

20. The system according to claim 14, wherein at least one of said axes has an attribute designator associated therewith.

21. A system according to claim 14, wherein said selection means selects, on each said axis, a respective point along the respective axis corresponding to a value for the respective attribute of another information entry, and said connection means forms a second polygonal shape corresponding to said another information entry on said monitor.

22. The system according to claim 21, wherein said polygonal shape and second polygonal shape are overlaid.

23. The system according to claim 14, wherein the attributes for said given information entry is stored in a memory attached to said selection means.

24. The system according to claim 14, wherein said selection and connection means form a multiplicity of polygonal shapes corresponding to a multiplicity of information entries.

25. The system according to claim 24, wherein said multiplicity of polygonal shapes are serially displayed on said monitor.

26. The system according to claim 14, wherein said multiplicity of axes comprises at least three said axes.

27. The system according to claim 14, wherein said multiplicity of axes comprises from three to eight axes.

28. An article of manufacture comprising a computer usable medium having computer readable program code means embodied thereon for displaying a plurality of information entries in a computer system having a monitor, memory and an input device, the computer readable program code means in said article of manufacture comprising:
   computer readable program code means for:
   (a) generating and displaying a multiplicity of axes on said monitor, each said axis corresponding to a respective attribute of a given information entry;
   (b) selecting, by a user of said method by pointing and clicking said input device on each said axis, a respective point along the respective axis corresponding to a value for the respective attribute of said given information entry; and
   (c) connecting the respective selected points along each axis by forming respective lines between the respective selected points between adjacent axes, thereby forming a polygonal shape on the monitor.

29. A program storage device readable by a machine and encoding a program of instructions for executing the steps of claim 1.

* * * * *